April 23, 1929.  C. H. WELCH  1,710,128
TIRE INFLATING AND DEFLATING VALVE
Filed Sept. 9, 1926
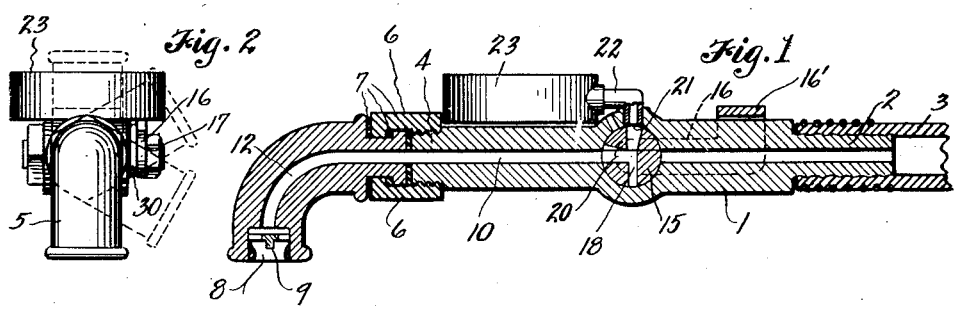
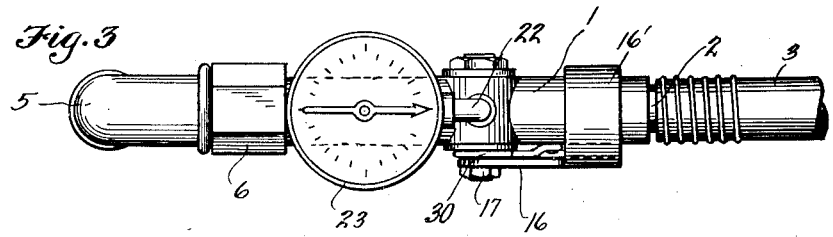
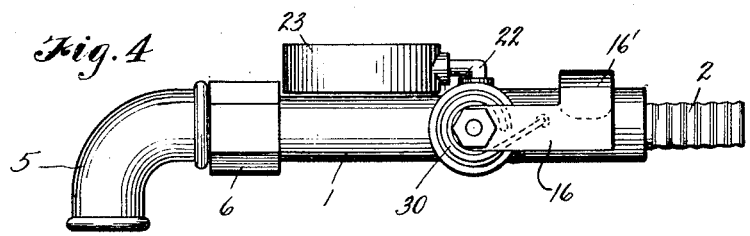
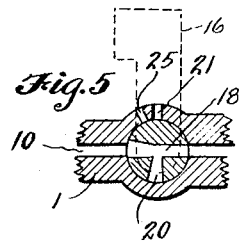 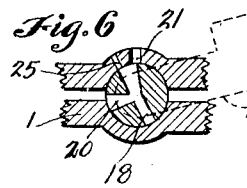 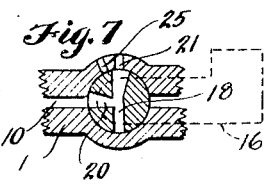
INVENTOR
CHARLES H. WELCH
BY
Richard J. Cook
ATTORNEY Patented Apr. 23, 1929.

1,710,128

UNITED STATES PATENT OFFICE.

CHARLES H. WELCH, OF PORTLAND, OREGON.

TIRE INFLATING AND DEFLATING VALVE.

Application filed September 9, 1926. Serial No. 134,547.

This invention relates to improvements in tire inflating valves, and more particularly to a combined inflating and deflating valve and pressure gauge of a type suitable for use at the end of an air hose such as is used in connection with pressure tanks or hand pumps.

It is the principal object of the present invention to provide a device of the above character whereby the pressure in a tire may be instantly determined before any air is admitted and wherein means is provided for the discharge of air from the tire in the event it should contain too much pressure, all being possible without necessitating disconnection or removal of the device from the tire valve filling stem.

Another object of the invention resides in the provision of an adjustable connecting member on the device whereby it is made easily applicable to valve stems regardless of their position.

A still further object is to provide means for automatically closing the valve when not in use so that no air will be wasted from the supply hose.

Other objects reside in the various details of construction and combination of parts and in the mode of operation of the device as will be hereinafter described.

In accomplishing the objects of the invention, I have provided the improved details of construction, the preferred forms of which are illustrated in the accompanying drawings, wherein—

Figure 1 is a longitudinal sectional view of a tire inflating valve and pressure gauge embodied by the present invention.

Figure 2 is an end view of the same, illustrating the adjustability of the connecting member.

Figure 3 is a top view of the device as shown in Figure 1.

Figure 4 is a side view of the same.

Figures 5, 6 and 7 are sectional details showing, respectively, positions of the valve member for inflating, discharging and when closed.

Referring more in detail to the drawings— 1 designates a tubular valve casing provided, at one end, with a reduced extension, or shank, 2, for insertion within an air supply hose, or the like, as designated at 3 and provided, at its opposite end, with a threaded shank 4 to which an elbow fitting 5 is revolubly fixed by means of a nut 6. Suitable packing, as designated at 7, is placed between the end of the shank 4 and fitting 5 so that leakage will not occur at this connection when the device is in use. At its outer end the fitting 5 has a socket 8 for receiving the end of a tire valve stem and a valve opening member 9 is provided in the socket so that when the device is applied to the tire valve stem the latter will be opened so that air may be admitted to the tire.

An air channel 10 is provided in the housing 1 and this communicates with the air hose and with a continuing passage 12 in the fitting 5 and, revolubly mounted in the housing 1 to control flow of air through the channel, is a valve plug 15 that is operable by means of a handle piece 16 that is fixed to one end of the plug by means of a nut 17. The valve plug has a transverse passage 18 adapted to provide direct connection, as shown in Figure 5, between the hose and the tire valve for inflating a tire. Leading laterally from the passage 18 is a passage 20 adapted, when the valve plug is in closed position, as shown in Figure 7, to provide connection between the tire being inflated and a port 21 at the top of housing 1 with which the stem 22 of a pressure gauge 23 is connected. Closely adjacent port 21 is a port 25 to atmosphere and, when the valve plug is adjusted slightly from closed position, one end of transverse passage 18 will overlap both ports 21 and 25 while passage 20 is in communication with the passage to the tire and in this way the pressure during deflating of a tire may be watched.

Fixed to the outside of the housing 1 and to the valve plug 15 is a spring 30 by means of which the valve will be moved to and yieldably held in closed position. The handle member 16 has an end portion 16' extended laterally and curved to closely fit over housing 1.

Assuming the device to be so constructed, it would be used as follows:

Since spring 30 normally holds the valve 15 in closed position, as shown in Figure 7, it thus provides communication, by means of passages 18, 20 and 21, between the outlet end of channel 12 and the pressure gauge. Thus, when the device is applied to a tire valve stem, the air pressure in the tire is instantly indicated by the pressure gauge. Then the operator, to inflate the tire to a higher pressure, opens the valve plug by movement of the handle 16 to position shown in Figure 5 to close the ports 21 and 25 and provide a direct connection between the supply hose and tire. Then to again determine the pressure, to see if it is sufficient or too much, the handle is swung back to closed position. If the pressure should be excessive, the handle is adjusted slightly toward open position, as shown in Figure 6, so as to provide for the exhaust of air through passages 20, 18 and 25, and during this time of deflation, the pressure is shown on the gauge, and when the desired pressure is reached, the valve handle is released and the valve instantly closed by spring 30.

Due to the revoluble mounting of the socket piece, or elbow, 5 on the valve housing, the device may be easily applied to a valve stem regardless of its position and the gauge retained at a position where easily read by the user.

Having thus described my invention, what I claim as new therein and desire to secure by Letters-Patent, is:

1. In a device of the character described, a valve housing having an air channel therethrough and having two laterally opening channels, a valve plug operable for controlling passage of air through the said channels; said plug having passages therethrough whereby direct communication may be provided through the channel while the lateral channels are both closed, and whereby either of the laterally opening channels, separately or both together, may be connected with the air channel at one side of the plug while direct passage through the channel is closed.

2. A device as in claim 1, wherein yieldable means is provided for normally holding the valve plug in a position for closing the air channel and to provide connection with one of the laterally opening channels and the air channel at one side of the plug.

Signed at Portland, Oregon, this 7th day of August, 1926.

CHARLES H. WELCH.